(12) United States Patent
Schied et al.

(10) Patent No.: US 10,600,167 B2
(45) Date of Patent: Mar. 24, 2020

(54) PERFORMING SPATIOTEMPORAL FILTERING

(71) Applicant: NVIDIA Corporation, Santa Clara, CA (US)

(72) Inventors: Christoph H. Schied, Karlsruhe (DE); Marco Salvi, Kirkland, WA (US); Anton S. Kaplanyan, Kirkland, WA (US); Aaron Eliot Lefohn, Kirkland, WA (US); John Matthew Burgess, Austin, TX (US); Anjul Patney, Kirkland, WA (US); Christopher Ryan Wyman, Redmond, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 170 days.

(21) Appl. No.: 15/874,611

(22) Filed: Jan. 18, 2018

(65) Prior Publication Data
US 2018/0204307 A1 Jul. 19, 2018

Related U.S. Application Data

(60) Provisional application No. 62/447,859, filed on Jan. 18, 2017.

(51) Int. Cl.
*G06T 5/20* (2006.01)
*G06T 11/60* (2006.01)
(Continued)

(52) U.S. Cl.
CPC ............ *G06T 5/20* (2013.01); *G06K 9/00986* (2013.01); *G06K 9/6273* (2013.01); *G06K 9/66* (2013.01);
(Continued)

(58) Field of Classification Search
CPC .. G06T 5/20; G06T 1/20; G06T 5/002; G06T 11/60; G06T 2207/20084;
(Continued)

(56) References Cited

U.S. PATENT DOCUMENTS

| 6,313,838 | B1 | 11/2001 | Deering |
| 2005/0276469 | A1 | 12/2005 | Kim |

(Continued)

FOREIGN PATENT DOCUMENTS

| CN | 102663438 A | 9/2012 |
| CN | 106127684 A | 11/2016 |

(Continued)

OTHER PUBLICATIONS

Office Action from Taiwanese Application No. 10721221440, dated Dec. 26, 2018.

(Continued)

*Primary Examiner* — Ming Y Hon
(74) *Attorney, Agent, or Firm* — Zilka-Kotab, PC

(57) ABSTRACT

A method, computer readable medium, and system are disclosed for performing spatiotemporal filtering. The method includes the steps of applying, utilizing a processor, a temporal filter of a filtering pipeline to a current image frame, using a temporal reprojection, to obtain a color and auxiliary information for each pixel within the current image frame, providing the auxiliary information for each pixel within the current image frame to one or more subsequent filters of the filtering pipeline, and creating a reconstructed image for the current image frame, utilizing the one or more subsequent filters of the filtering pipeline.

20 Claims, 10 Drawing Sheets

(51) Int. Cl.
G06K 9/66 (2006.01)
G06K 9/62 (2006.01)
G06K 9/00 (2006.01)
G06T 1/20 (2006.01)
G06T 5/00 (2006.01)

(52) U.S. Cl.
CPC ............... *G06T 1/20* (2013.01); *G06T 5/002* (2013.01); *G06T 11/60* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/20182* (2013.01)

(58) Field of Classification Search
CPC . G06T 2207/20081; G06T 2207/20182; G06T 2207/10024; G06T 2207/10028; G06T 2207/10016; G06K 9/6273; G06K 9/00986; G06K 9/66
See application file for complete search history.

(56) References Cited

U.S. PATENT DOCUMENTS

| | | | |
|---|---|---|---|
| 2006/0018562 A1* | 1/2006 | Ruggiero | G06F 9/3879 382/300 |
| 2009/0167763 A1 | 7/2009 | Waechter et al. | |
| 2010/0183217 A1 | 7/2010 | Seung et al. | |
| 2012/0057783 A1* | 3/2012 | Yamada | G06T 7/11 382/165 |
| 2013/0245462 A1* | 9/2013 | Capdevila | A61B 5/02405 600/479 |
| 2014/0139643 A1* | 5/2014 | Hogasten | H01L 27/14609 348/48 |
| 2014/0279771 A1 | 9/2014 | Golovashkin et al. | |
| 2014/0314310 A1* | 10/2014 | Movellan | G06K 9/00302 382/155 |
| 2014/0354675 A1* | 12/2014 | Lottes | G06T 5/20 345/591 |
| 2015/0379727 A1 | 12/2015 | Golas et al. | |
| 2016/0026899 A1* | 1/2016 | Wang | G06T 7/11 382/176 |
| 2016/0098820 A1* | 4/2016 | Rousselle | G06T 5/002 345/426 |
| 2016/0140421 A1* | 5/2016 | Edpalm | H04N 19/172 382/220 |
| 2016/0210778 A1 | 7/2016 | Zimmer et al. | |
| 2016/0292589 A1 | 10/2016 | Taylor, Jr. et al. | |
| 2016/0321523 A1 | 11/2016 | Sen et al. | |
| 2016/0358068 A1 | 12/2016 | Brothers et al. | |
| 2016/0358069 A1 | 12/2016 | Brothers et al. | |
| 2016/0358072 A1 | 12/2016 | Hermann et al. | |
| 2016/0358321 A1 | 12/2016 | Xu et al. | |
| 2017/0061582 A1* | 3/2017 | Lim | G06K 9/6201 |
| 2017/0103264 A1* | 4/2017 | Javan Roshtkhari | G06K 9/00718 |
| 2017/0200063 A1 | 7/2017 | Nariyambut Murali et al. | |
| 2018/0025257 A1 | 1/2018 | van den Oord et al. | |
| 2018/0204314 A1 | 7/2018 | Kaplanyan et al. | |
| 2018/0293711 A1* | 10/2018 | Vogels | G06K 9/40 |
| 2019/0258907 A1 | 8/2019 | Rezende et al. | |
| 2019/0287226 A1 | 9/2019 | Holub | |

FOREIGN PATENT DOCUMENTS

| | | |
|---|---|---|
| CN | 106204468 A | 12/2016 |
| CN | 106204489 A | 12/2016 |
| CN | 106251303 A | 12/2016 |
| CN | 106709568 A | 5/2017 |
| CN | 106991646 A | 7/2017 |
| TW | 201138468 A | 11/2011 |
| WO | 2017091833 A1 | 6/2017 |
| WO | 2017132288 A1 | 8/2017 |

OTHER PUBLICATIONS

Non-Final Office Action from U.S. Appl. No. 15/872,838, dated Oct. 9, 2019.
Yang et al., "Deep Edge Guided Recurrent Residual Learning for Image Super-Resolution," IEEE Transactions on Image Processing, 2017, vol. 26, Issue 12, pp. 1-12.
Yamanaka et al., "Fast and Accurate Image Super Resolution by Deep CNN with Skip Connection and Network in Network," International Conference on Neural Information Processing, Springer, Cham, 2017, pp. 1-9.
Zhao, A., "Image Denoising with Deep Convolutional Neural Networks," Stanford University, 2016, pp. 1-5.
Tong et al., "Image Super-Resolution Using Dense Skip Connections," IEEE International Conference on Computer Vision (ICCV), 2017, pp. 1-9.
Mao et al., "Image Restoration Using Very Deep Convolutional Encoder-Decoder Networks with Symmetric Skip Connections," 2016, 29th Conference on Neural Information Processing Systems (NIPS 2016), pp. 1-9.
Li et al., "Joint Image Filtering with Deep Convolutional Networks," arXiv preprint arXiv:1710.04200, 2017, pp. 1-14.
Bako et al., "Kernel-predicting convolutional networks for denoising Monte Carlo renderings," ACM Transactions on Graphics (TOG), Jul. 2017, vol. 36, No. 4, pp. 1-14.
Tai et al., "MemNet: A Persistent Memory Network for Image Restoration," Proceedings of the IEEE Conference on Computer Vision and Pattern Recognition, 2017, pp. 1-9.
Oord et al., "Pixel Recurrent Neural Networks." arXiv preprint arXiv:1601.06759, 2016, pp. 1-11.
Kalantari et al., "A Machine Learning Approach for Filtering Monte Carlo Noise," ACM Transactions on Graphics, vol. 34, No. 4, Aug. 2015, pp. 1-12 retrieved from http://cvc.ucsb.edu/graphics/Papers/SIGGRAPH2015_LBF/PaperData/SIGGRAPH15_LBF.pdf.
Mao et al., "Image Restoration Using Convolutional Auto-encoders with Symmetric Skip Connections," Cornell University Library, Aug. 2016, pp. 1-17 retrieved from https://arxiv.org/pdf/1606.08921.pdf.
Huang et al., "Bidirectional Recurrent Convolutional Networks for Multi-Frame Super-Resolution," Advances in Neural Information Processing Systems 28 (NIPS) 2015, pp. 1-9 retrieved from https://papers.nips.cc/paper/5778-bidirectional-recurrent-convolutional-networks-for-multi-frame-super-resolution.pdf.
Kaplanyan et al., U.S. Appl. No. 15/872,838, filed Jan. 16, 2018.
Dammertz et al., "Edge-Avoiding À-Trous Wavelet Transform for fast Global Illumination Filtering," High Performance Graphics, 2010, pp. 1-10.
Kalantari et al., "Removing the Noise in Monte Carlo Rendering with General Image Denoising Algorithms," Eurographics, vol. 32, No. 2, 2013, pp. 1-10.
Li et al. "SURE-based Optimization for Adaptive Sampling and Reconstruction," ACM Transactions on Graphics, vol. 31, No. 6, Nov. 2012, pp. 194:1-194:9.
Mehta et al., "Axis-Aligned Filtering for Interactive Sampled Soft Shadows," ACM Transactions on Graphics, vol. 31, Nov. 2012, pp. 1-10.
Mehta et al., "Axis-Aligned Filtering for Interactive Physically-Based Diffuse Indirect Lighting," ACM Transactions on Graphics, vol. 32, Jul. 2013, pp. 1-11.
Mehta et al., "Factored Axis-Aligned Filtering for Rendering Multiple Distribution Effects," ACM Transactions on Graphics, vol. 33, No. 4, Jul. 2014, pp. 57:1-57:12.
Karis, B., "High-Quality Temporal Supersampling," A course in Advances in Real-Time Rendering in 3D Graphics and Games, Vancouver SIGGRAPH 2014 Courses, 2014, 12 pages retrieved from http://advances.realtimerendering.com/s2014/index.html#_HIGH-QUALITY_TEMPORAL_SUPERSAMPLING.
Karis, B., "High-Quality Temporal Supersampling," SIGGRAPH 2014 Advances in Real-Time Rendering in Games, Course Power Point Presentation, 2014, 55 pages.

* cited by examiner

PERFORMING SPATIOTEMPORAL FILTERING

CLAIM OF PRIORITY

This application claims the benefit of U.S. Provisional Application No. 62/447,859 titled "RECONSTRUCTION OF NOISY MONTE CARLO IMAGE SEQUENCES USING A RECURRENT AUTOENCODER AND SPATIOTEMPORAL VARIANCE-GUIDED FILTERING FOR RECONSTRUCTION OF GLOBAL ILLUMINATION IMAGES," filed Jan. 18, 2017, the entire contents of which is incorporated herein by reference.

FIELD OF THE INVENTION

The present invention relates to image rendering, and more particularly to performing reconstruction on sampled images during a rendering process.

BACKGROUND

Current image reconstruction methods used to reduce the noise created by high quality sampling are unable to be implemented in a real-time ray tracing environment, where sampling is limited due to current computing constraints. There is therefore a need for a filtering pipeline that can reduce, in real-time, image noise produced by Monte Carlo sampling.

Thus, there is a need for addressing these issues and/or other issues associated with the prior art.

SUMMARY

A method, computer readable medium, and system are disclosed for performing spatiotemporal filtering. The method includes the steps of applying, utilizing a processor, a temporal filter of a filtering pipeline to a current image frame, using a temporal reprojection, to obtain a color and auxiliary information for each pixel within the current image frame, providing the auxiliary information for each pixel within the current image frame to one or more subsequent filters of the filtering pipeline, and creating a reconstructed image for the current image frame, utilizing the one or more subsequent filters of the filtering pipeline.

DETAILED DESCRIPTION

Figure 1:
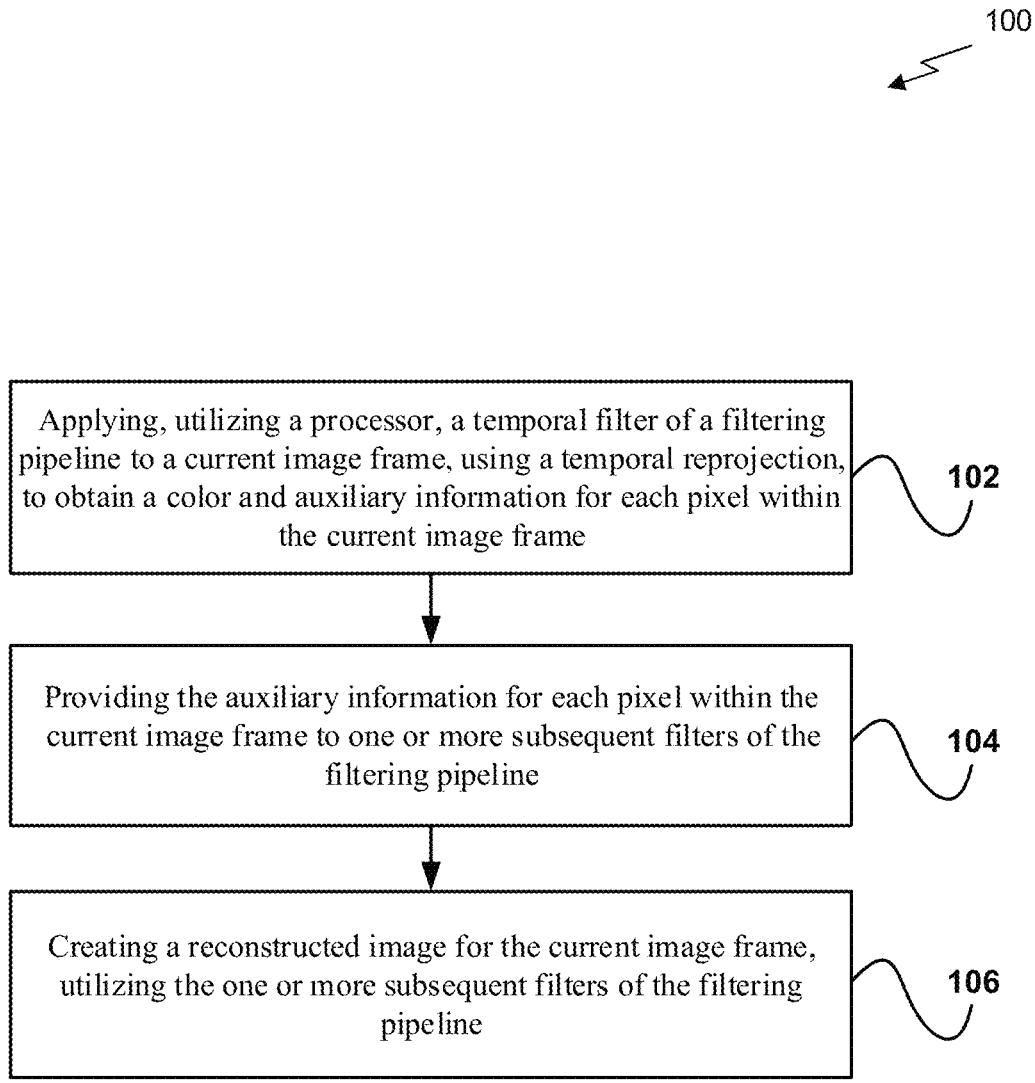
FIG. 1 illustrates a flowchart of a method for performing spatiotemporal filtering, in accordance with one embodiment.

FIG. 1 illustrates a flowchart of a method 100 for performing spatiotemporal filtering, in accordance with one embodiment. As shown in operation 102, a temporal filter of a filtering pipeline is applied, utilizing a processor, to a current image frame, using a temporal reprojection, to obtain a color and auxiliary information for each pixel within the current image frame. In one embodiment, the image frame may include a scene to be rendered. For example, the image frame may include a plurality of pixels. In another embodiment, the image frame may be one of a plurality of image frames that constitute an animation.

Additionally, in one embodiment, the image frame may include a number of samples per pixel (spp) below a predetermined threshold. For example, the image frame may include one sample per pixel. In another embodiment, the image frame may result from a Monte Carlo sampling method. In another embodiment, the temporal filter may perform temporal anti-aliasing on the current image frame. For example, the temporal filter may reduce or remove effects of temporal aliasing between the current image frame and previous and/or subsequent image frames.

Further, in one embodiment, the filtering pipeline may include one or more temporal and/or spatial filters that are applied to one or more image frames (e.g., to reduce noise within and/or between image frames, etc.). In another embodiment, the temporal reprojection may include a geometry phase temporal reprojection. In yet another embodiment, the temporal reprojection may include accumulating samples for each pixel of the current image frame from previously filtered image frames. For example, previous samples may be stored in one or more history buffers. In another example, previous samples may be reused within the temporal filter to obtain the color and auxiliary information.

Further still, in one embodiment, the color for each pixel may include an accumulated color for the pixel, based on the accumulated samples. In another embodiment, the auxiliary information for each pixel may include a color variance for the pixel. In yet another embodiment, the auxiliary information for each pixel may include a luminance variance for the pixel. In still another embodiment, the auxiliary information for each pixel may include frequency analysis information regarding nearby geometry.

Also, in one embodiment, the auxiliary information for each pixel may include a confidence metric of the color for the pixel. For example, the auxiliary information may include a confidence estimate of a temporal mean color for the pixel. For instance, a temporal mean color may be computed for the pixel. Additionally, a variance may be calculated by comparing the temporal mean color to a noisy color at the pixel. In this way, the confidence estimate may be used to determine an amount of noise remining locally on the image.

In addition, in one embodiment, the auxiliary information may be generated using results of previous frame filtering. In another embodiment, the auxiliary information may be generated using information derived from intermediate steps applied by one or more filters during previous frames.

Furthermore, as shown in operation 104, the auxiliary information for each pixel within the current image frame is provided to one or more subsequent filters of the filtering pipeline. In one embodiment, the subsequent filters may include one or more additional temporal filters. For example, the subsequent filters may include one or more temporal anti-aliasing (TAA) filters.

Further still, in one embodiment, the subsequent filters may include one or more spatial filters. For example, the one or more spatial filter may perform one or more spatial anti-aliasing operations on the current image frame. In another example, the spatial filter may remove signal components that have a higher frequency than is able to be appropriately resolved.

Also, in one embodiment, the filtering pipeline may include the temporal filter, followed by the one or more subsequent filters. In another embodiment, the subsequent filters may include one or more temporal and/or spatial filters in any order. In yet another embodiment, the auxiliary information may be used as input for parameters of the one or more subsequent filters. For example, the subsequent filters may be adjusted, based on the auxiliary information. This may result in the preservation of increased detail within the resulting image.

Additionally, in one embodiment, the temporal filter and subsequent filters may be applied to reduce noise within the current image frame. In another embodiment, the information output from one subsequent filter may be used as input to another subsequent filter within the current image frame. In yet another embodiment, the information output from one subsequent filter may be used as input to another subsequent filter within a subsequent image frame.

Further, as shown in operation 106, a reconstructed image is created for the current image frame, utilizing the one or more subsequent filters of the filtering pipeline. In one embodiment, the temporal filter and the subsequent filters may work together within the filtering pipeline to create the reconstructed image. In another embodiment, the subsequent filters may perform additional anti-aliasing actions to remove noise within the reconstructed image of the current image frame during the creation of the reconstructed image.

Further still, in one embodiment, the creating of the reconstructed image may include storing pixel information in a history buffer for future image frames. In another embodiment, the reconstructed image may have a reduced amount of noise compared to an initial image within the current image frame input into the filtering pipeline. In yet another embodiment, the reconstructed image may be temporally stable and may implement global illumination.

Also, in one embodiment, direct illumination may be implemented for the reconstructed image. For example, direct illumination may be sparsely sampled for virtual reality (VR) within the image frame. In another example, the temporal filter of the filtering pipeline may be applied to the image frame, using a temporal reprojection, to obtain the auxiliary information for each pixel within the current image frame. In yet another example, the one or more subsequent filters may create the reconstructed image, using the auxiliary information.

In addition, in one embodiment, the reconstructed image may be displayed within an automobile. For example, the reconstructed image may be displayed as part of a dashboard rendering. In another example, the reconstructed image may correct missing data on camera captures (e.g., by performing denoising, reconstruction, etc.). For instance, the missing data may be a result of one or more broken or dirty cameras within a vehicle.

Furthermore, in one embodiment, the temporal and spatial filters may include one or more deep neural networks (DNNs). For example, each of the one or more DNNs may be trained to generate a confidence value that may be used to implement the filter.

In this way, temporal reprojection may be used to increase an effective sample count for a pixel within an image frame. Additionally, auxiliary information for pixels may be passed from an initial temporal filter to subsequent filters (e.g., temporal and/or spatial filters, etc.). Further, intermediate filter output within the filtering pipeline may be used as input to other intermediate filters within the same frame and/or different frames to be rendered.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
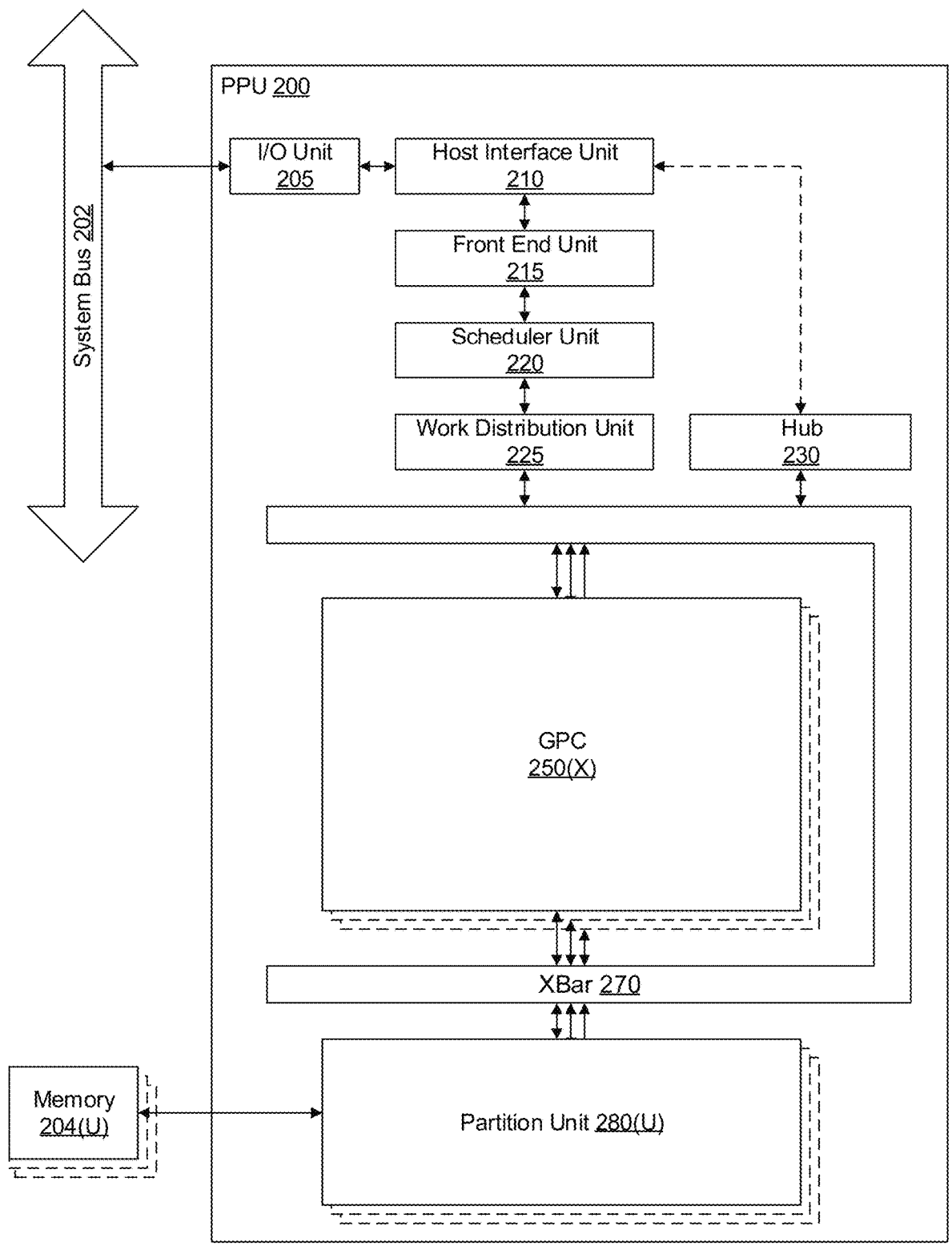
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
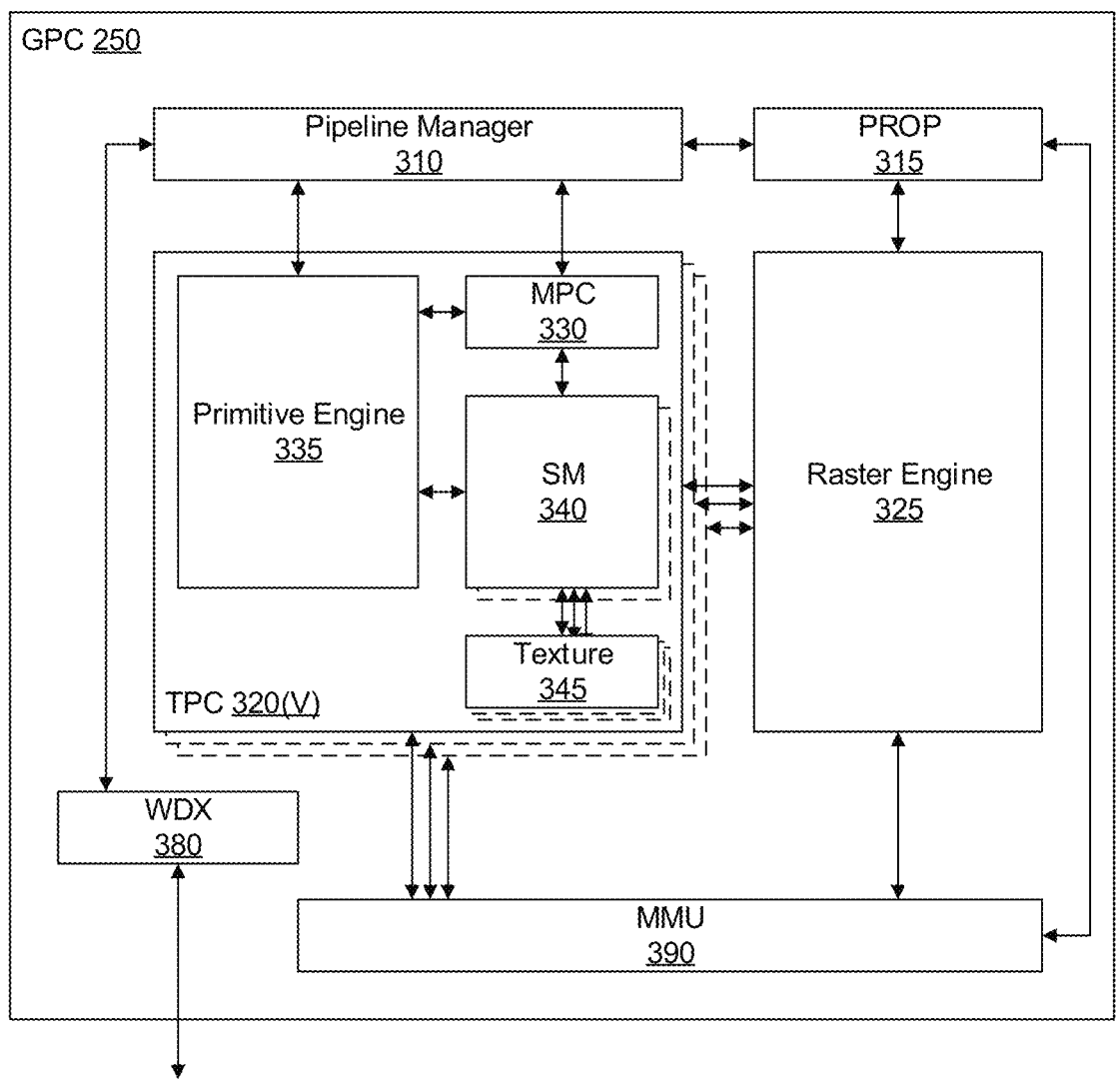
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
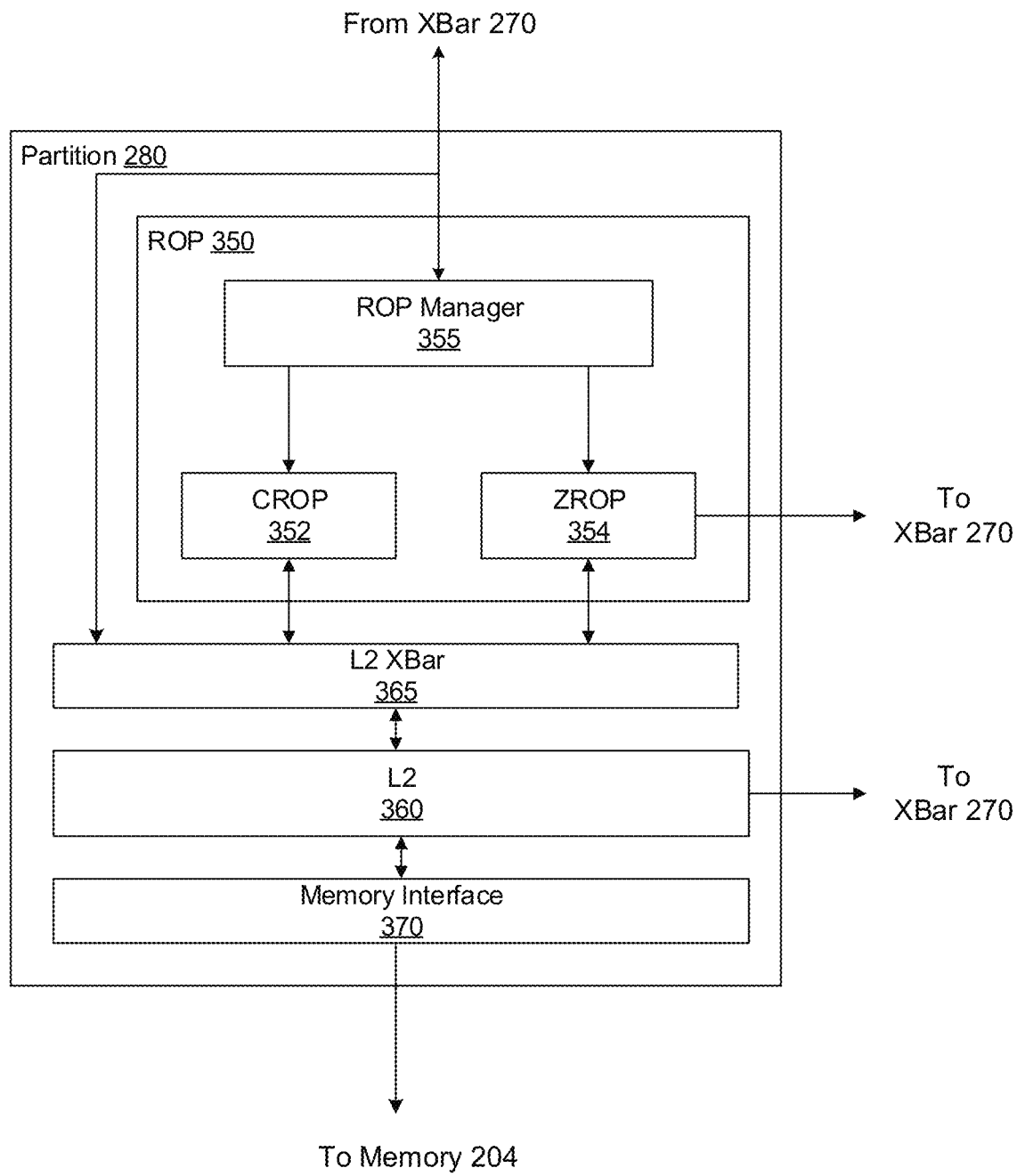
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
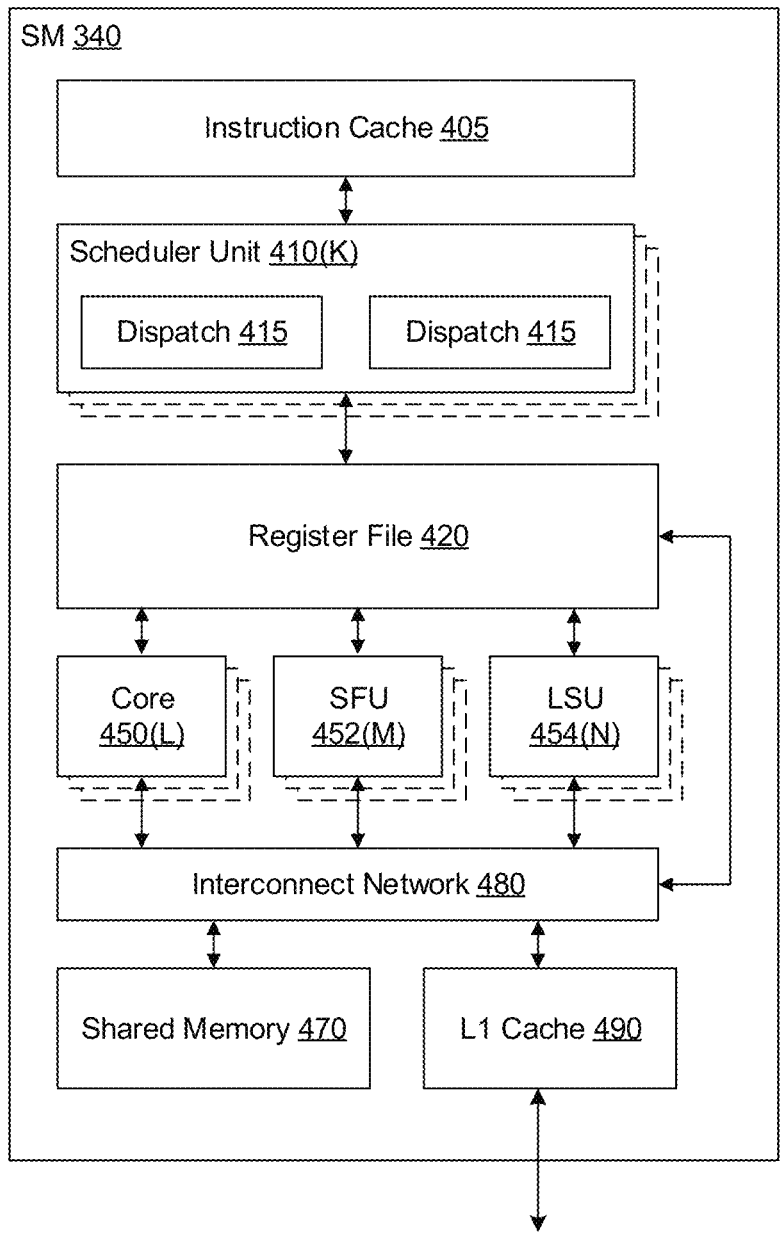
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
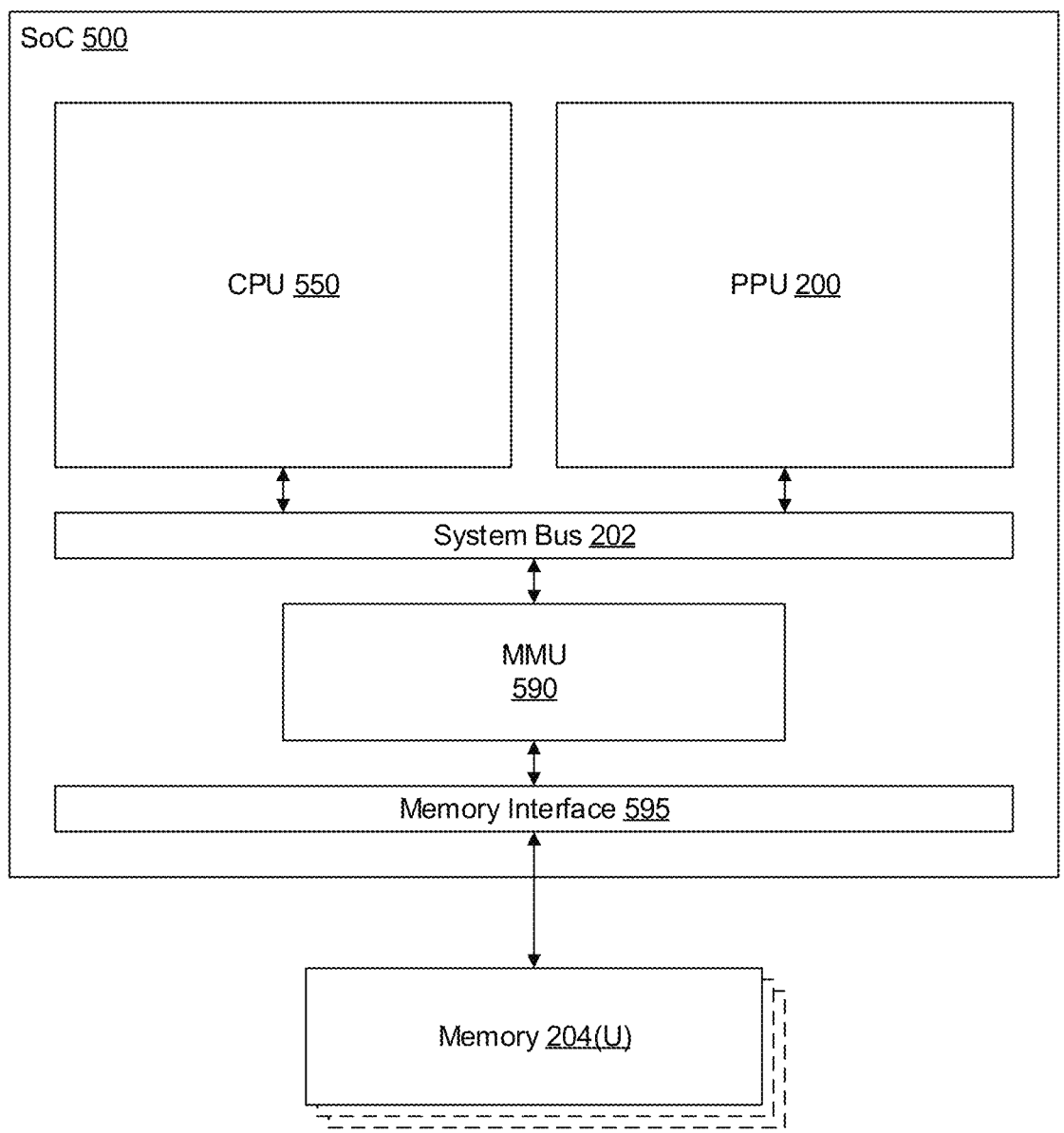
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
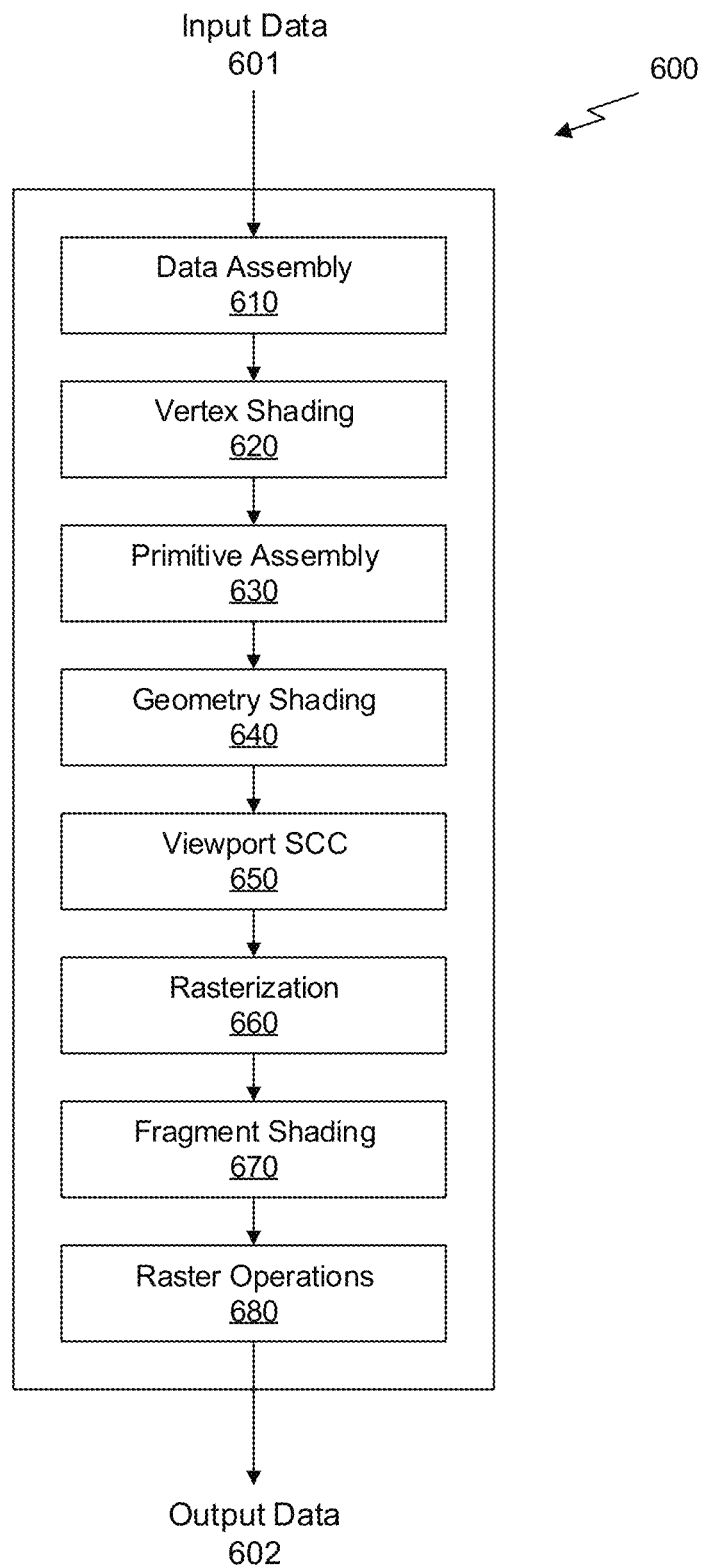
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640).

Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
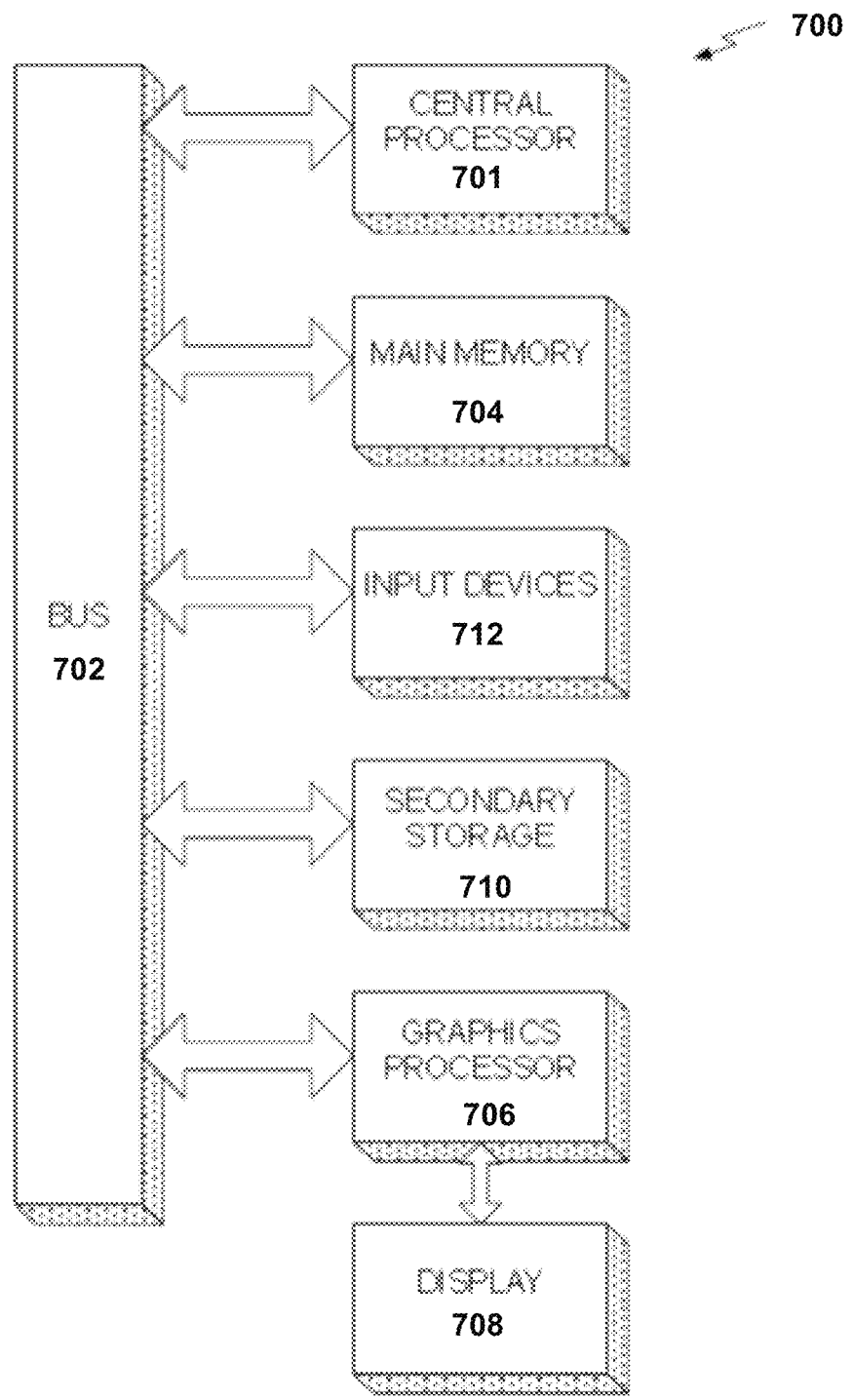
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Spatiotemporal Variance-Guided Filtering
Introduction

Path tracing is an effective rendering algorithm film and visual effects. Advanced filter and reconstruction kernels may reduce Monte Carlo sampling's inevitable noise. These kernels may allow noise-free reconstruction of images with dozens to hundreds of samples per pixel. With further algorithmic advances, a shift to path traced global illumination may be enabled for real-time graphics.

Both video games and film recently migrated from empirical models to physically-based shading, but the simplified light transport available in rasterization continues to push developers to consider ray tracing for accurate shadows and reflections, and in the continuation path traced global illumination. Unfortunately, current real-time ray tracing performance is limited to 200-300 Mrays/sec, i.e., a few rays per pixel at 1920×1080 and 30 Hz. This number is even lower for production usage with dynamic acceleration structures, large scenes, and variable CPU/GPU performance. Therefore, with multiple rays per path and the trends towards higher resolutions and refresh rates, practical performance may not exceed one path per pixel for the foreseeable future. By developing a reconstruction filter that respects this constraint, real-time path tracing may be enabled.

In one embodiment, a hierarchical, wavelet-based reconstruction filter may output temporally stable global illumination, including diffuse and specular interreflections, and soft shadows from a stream of one sample per pixel (spp) images. Reconstruction at this low sampling rate presents numerous challenges. In particular, high variance from poor sampling obscures high frequency signals and, with one sample, distinguishing between sources of noise proves difficult. For example, noise from spatially sampling a high-frequency surface texture becomes conflated with variance introduced by light transport and visibility events. Given a real-time performance target, a filter may leverage prior frames' samples to help isolate fine details and decouple sources of noise, even in the context of animated scenes. The filter may not require scene-dependent parameters or knowledge of the underlying light transport algorithm. At 1920×1080, it may run in around 10 ms today on a modern GPU, which may enable real-time path traced global illumination.

Additionally, in one embodiment, a fast, robust, and temporally stable filter may be implemented that may reconstruct high-quality images from single path per pixel inputs. In another embodiment, spatiotemporal estimation of color variance may be performed. In yet another embodiment, improved edge-stopping functions may be implemented that avoid filtering over sharp visibility or shadow edges.

Reconstruction Pipeline
Path Tracing

In one embodiment, as input to a reconstruction filter, standard path tracing may be used with next event estimation to generate 1 spp color samples. The path tracer may include optimizations to better utilize available GPU resources, including use of a rasterizer to efficiently generate primary rays. This may provide a noise-free G-buffer containing additional surface attributes used to steer the reconstruction filter.

In another embodiment, a low-discrepancy Halton sequence may drive all stochastic decisions to ensure good coverage of path space. A small set of Halton samples (e.g., 16, etc.) may be looped through as the temporal filters' exponential moving average may lose contributions from earlier samples after a few frames. For non-diffuse surfaces after a path's first scattering event, path space regularization may be applied. Regularization may increase surface roughness in secondary scattering events, which may allow the path tracer to find contributions for indirect bounces by connecting to the light source, even with highly glossy materials. This may increase light transport robustness and may allow paths to contribute more uniformly. The path length may also be restricted to one additional scattering event per path, which may limit computational costs. In this way, one ray may be traced to find indirectly visible surfaces, in addition to two shadow rays to connect primary and secondary hit points to a light source.

In yet another embodiment, the path tracer may output direct and indirect illumination separately. This may enable the filter to account for local smoothness independently in both components, and may allow better reconstruction of poorly sampled shadow edges.

Reconstruction

In one embodiment, surface albedo (including textures and spatially-varying BRDFs) of directly visible surfaces may be demodulated from sample colors. This may avoid having to prevent over-blurring of high frequency texture details by the filter. In other words, untextured illumination components may be filtered, and texturing may be reapplied after reconstruction. Besides removing the need of preventing the filter from overly blurring texture details, this may also increase the possible spatial reuse for neighboring samples. In the case of multi-layer materials, per-layer albedos may be added, which may be weighted by their sampling probability.

In another embodiment, the reconstruction may perform three steps: (1) temporally accumulating 1 spp path-traced inputs to increase effective sampling rate, (2) using temporally augmented color samples to estimate local luminance variance, and (3) using these variance estimates to drive a hierarchical a-trous wavelet filter. After reconstruction, the filter output may be (re-)modulated with the surface albedo.

Post Processing

After reconstruction, post processing may be performed. The filtered result may go through a tone mapping operator to handle a high dynamic range. Finally, temporal antialiasing may be performed to increase temporal stability and filter aliasing along geometric edges that the reconstruction filter preserves.

Figure 8:
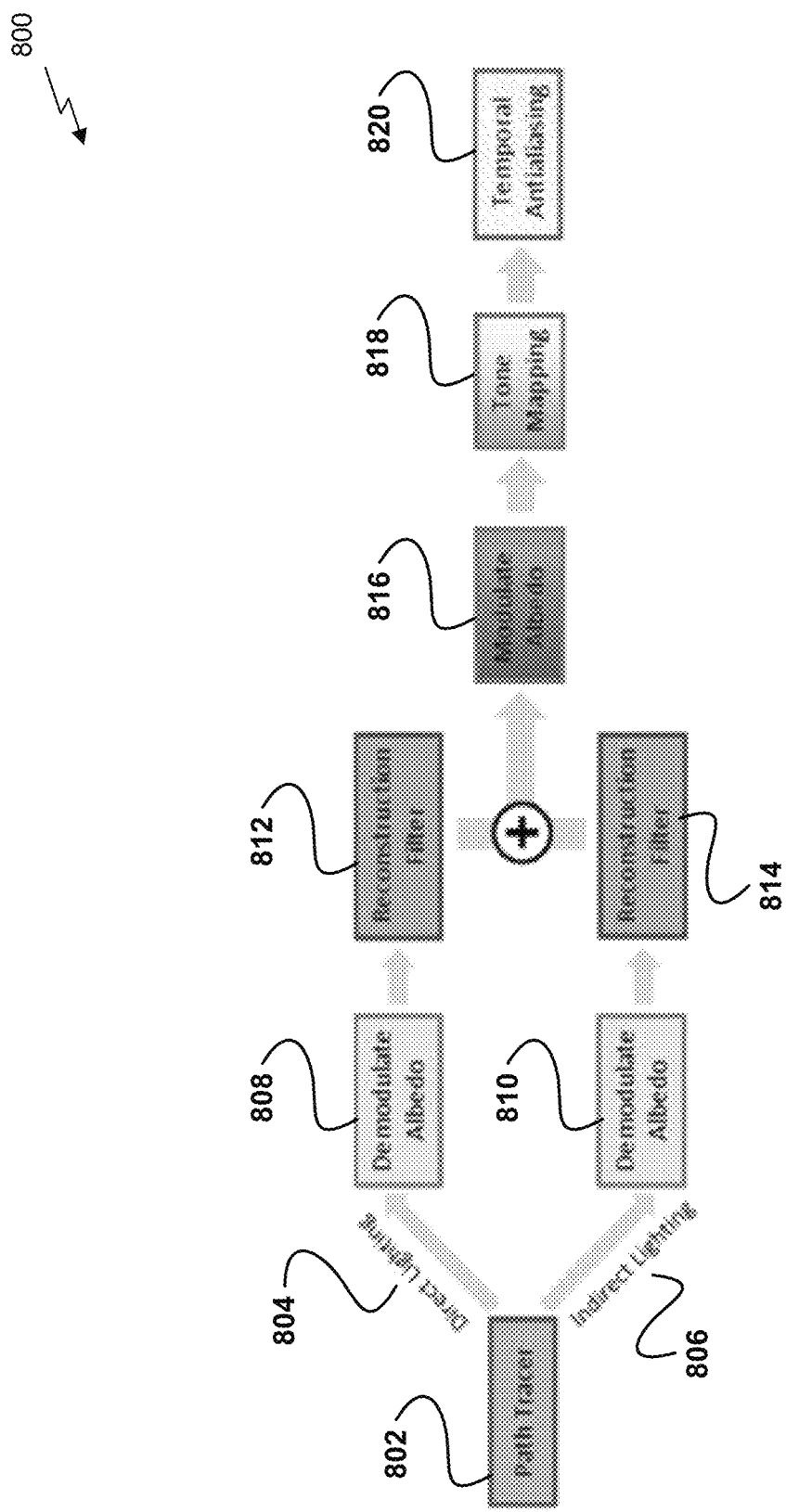
FIG. 8 illustrates an exemplary reconstruction pipeline, in accordance with one embodiment.

FIG. 8 illustrates an exemplary reconstruction pipeline 800, according to one embodiment. As shown, a path tracer 802 provides direct lighting inputs 804 and indirect lighting inputs 806, which have their surface albedo demodulated by albedo demodulators 808 and 810. In one embodiment, demodulation may be based on the rasterized G-buffer. This demodulation may focus reconstruction on light transport, rather than denoising high frequency texture detail.

Additionally, reconstruction filters 812 and 814 are applied to the output from the albedo demodulators 808 and 810. The output of the reconstruction filters 812 and 814 is then combined with primary albedo, using the albedo modulator 816. The output of the albedo modulator 816 is sent to a tone mapping filter 818, which applies tone mapping, and a temporal antialiasing filter 820, which applies temporal antialiasing.

Spatiotemporal Filter

In one embodiment, the reconstruction filter may take a 1 spp path-traced color buffer as input, along with a rasterized G-buffer and history buffers from the prior frame's reconstruction. A reconstructed image and the following frames' history buffers may be output by the reconstruction filter.

In another embodiment, the G-buffer may contain depth, object- and world-space normals, mesh ID, and screen-space motion vectors generated from a rasterization pass for primary visibility. The history buffers may include temporally integrated color and color moment data along with the prior frame's depths, normals, and mesh IDs. To increase robustness, use of scene-specific information, such as light positions, shape, or other scene properties, may be avoided, and no particular light transport method may be assumed.

Figure 9:
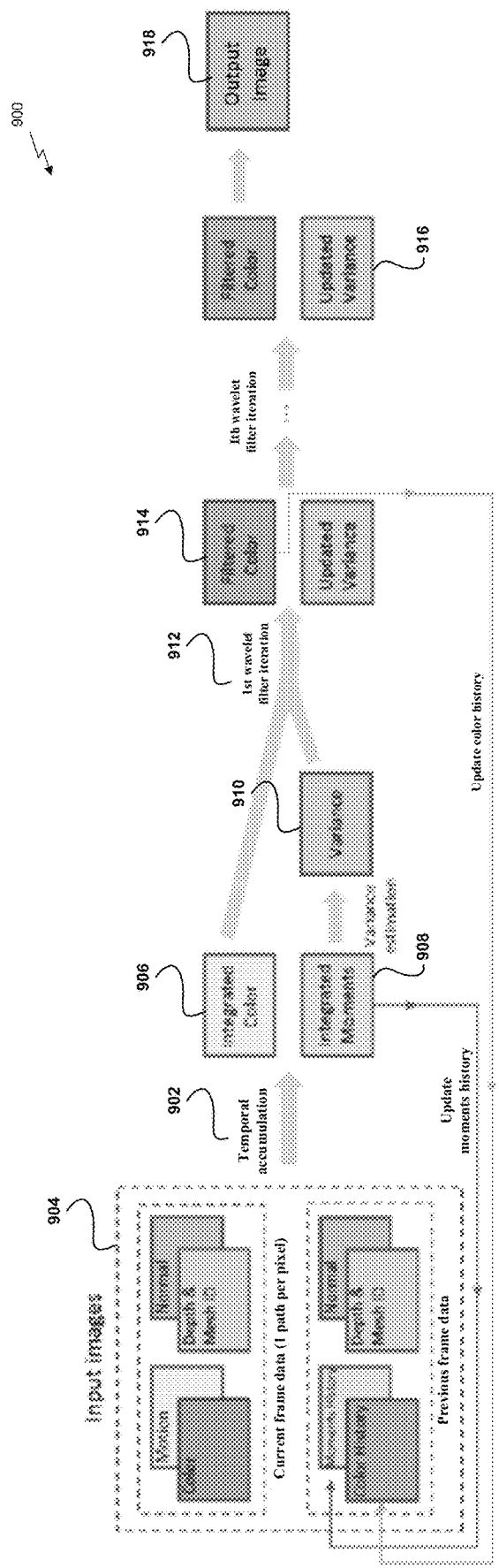
FIG. 9 illustrates an exemplary reconstruction filter, in accordance with one embodiment.

FIG. 9 illustrates an exemplary reconstruction filter 900, according to one embodiment. As shown, temporal filtering 902 is applied to deep frame buffers 904 to get temporally integrated color 906 and moments 908. An estimated luminance variance 910 is used to drive an edge-aware spatial wavelet filter. The wavelet filter's first iteration 912 provides a color history 914 and moment history 916 to help temporally filter future frames. The reconstructed result 918 feeds back into a reconstruction pipeline, where albedo as remodulated, tonemapping is performed, and a final temporal antialiasing pass is run.

Temporal Filtering

In one embodiment, color-based temporal filtering may introduce artifacts when applied to very noisy inputs. These artifacts may be minimized, the effective sample count may be increased, by adopting a geometry-based temporal filter.

As in temporal anti-aliasing (TAA), a 2D motion vector associated with each color sample $C_i$ may be required for frame i. This may describe geometric motion from the prior frame, and may allow the back-projection of $C_i$ to its screen space location in the prior frame. By accessing a color history buffer, output by the filter in the prior frame, color samples may be continuously accumulated over multiple frames. For each $C_i$ back-projecting may be performed to find sample $C_{i-1}$ from the color history buffer, and the two samples' depths, object-space normals, and mesh IDs may be compared to determine if they are consistent (i.e., on the same surface). These consistency tests may use empirical similarity metrics similar to the fragment merge heuristics. Consistent samples may be accumulated as a new integrated color $C_i'$ via an exponential moving average:

$$C_i' = \alpha \cdot C_i + (1-\alpha) \cdot C_{i-1}$$

In one embodiment, α may control the temporal fade, trading temporal stability for lag. For example, α may have a value of 0.2. Motion vectors may handle camera and rigid object motion, and more complex transformations may be possible with the addition of more data in the history buffer and more involved consistency tests.

In another embodiment, to improve image quality under motion, $C_{i-1}$ may be resampled by using a 2×2 tap bilinear filter. Each tap may individually test back-projected depths, normals, and mesh IDs. If a tap contains inconsistent geometry, the sample may be discarded and its weight may be uniformly redistributed over consistent taps. If no taps remain consistent, a larger 3×3 filter may be used to help find thin geometry such as foliage. If consistent geometry is still not found, the sample may represent a disocclusion, so the temporal history may be discarded and $C_i' = C_i$ may be used.

Variance Estimation

To drive an a-trous wavelet filter, the per-pixel variance of color luminance may be estimated as an efficient proxy for detecting noise. One idea is that reconstruction should avoid changing samples in regions with little or no noise (e.g., fully shadowed regions, etc.) while filtering more in sparsely sampled, noisy regions. Note that variance may provide an imperfect proxy for noise: noise may increase luminance variance, but luminance variance may occur without noise.

In one embodiment, per-pixel luminance variance may be estimated using $\mu_{1_i}$ and $\mu_{2_i}$, the first and second raw moments of color luminance. To improve the estimate, these moments along may be temporally filtered with color samples, reusing the consistency tests to generate integrated moments $\mu'_{1_i}$ and $\mu'_{2_i}$. The integrated moments may be ouput from the filter for use in subsequent frames. Temporal variance may then be estimated using the formula:

$$\sigma_i'^2 = \mu'_{2_i} - \mu'^2_{1_i}.$$

In another embodiment, camera motion, animations, and viewport boundaries may all cause disocclusion events, which may impact the quality of variance estimates. Where a temporal history is limited (e.g., <4 frames since a disocclusion, etc.), the variance $\sigma'^2_i$ may be estimated spatially, using a 7×7 bilateral filter with weights driven by depths and world-space normals. In yet another embodiment, for a few frames after a disocclusion the filter may rely on a spatial estimate of variance until the temporal accumulation has collected sufficient data for a stable estimate.

Edge-Avoiding a-Trous Wavelet Transform

The a-trous wavelet transform may hierarchically filter over multiple iterations, each with increasing footprint but a constant number of non-zero elements. Discarding detail coefficients may smooth the input while edge-stopping functions may preserve sharp details by limiting filter extent at boundaries.

The rasterized G-buffer may contain no stochastic noise, which may allow the definition of edge-stopping functions that identify common surfaces using G-buffer attributes. One implementation may realize each step of an edge-aware a-trous wavelet decomposition using a 5×5 cross-bilateral filter with weight function w(p; q) between pixels p, q:

$$\hat{c}_{i+1}(p) = \frac{\sum_{q \in \Omega} h(q) \cdot w(p, q) \cdot \hat{c}_i(q)}{\sum_{q \in \Omega} h(q) \cdot w(p, q)}. \quad (1)$$

In one embodiment, h=(1/16, 1/4, 3/8, 1/4, 1/16) is the filter kernel and $\Omega$ is the gathered filter footprint.

The weight function w(p; q) may combine geometrical and color based edge-stopping functions. In one embodiment, the weight function may instead uses depth, world-space normals, as well as the luminance of the filter input:

$$w_i(p, q) = \begin{cases} 1 & \text{if } p = q, \\ w_z \cdot w_n \cdot w_l & \text{otherwise.} \end{cases} \quad (2)$$

Before applying a wavelet filter, the luminance edge stopping function may be tuned, based on the local estimate of luminance variance. The wavelet filter may then be applied to the temporally integrated color as per Equation 1, and by assuming the variance samples are uncorrelated, filtering may be performed as follows:

$$\text{Var}(\hat{c}_{i+1}(p)) = \frac{\sum_{q \in \Omega} h(q)^2 \cdot w(p, q)^2 \cdot \text{Var}(\hat{c}_i(q))}{\left( \sum_{q \in \Omega} h(q) \cdot w(p, q) \right)^2}.$$

In one embodiment, the result may be used to steer the edge-stopping functions for the next level of the a-trous transform. The reconstruction may use a five-level wavelet transform, which may give an effective 65×65 pixel filter footprint.

As part of the wavelet transform, the filtered color from the first wavelet iteration may be output as a color history used to temporally integrate with future frames. While filtered colors could be used from other wavelet levels, using the first wavelet iteration for temporal integration may balance improved temporal stability with bias from spatial filtering.

Edge-Stopping Functions

Given a real-time requirement, the three edge-stopping functions in Equation 2 may be used to maximize temporal stability and robustness, potentially in exchange for increased spatial bias. Each function's ability to reject samples may be individually controlled by parameters $\sigma_z$, $\sigma_n$ and $\sigma_l$. While a range of values for these parameters may be effective, $\sigma_z=1$, $\sigma_n=128$ and $\sigma_l=4$, may be used on one or more scenes, and these parameters may not be exposed to the user.

Depth

Realistic scenes may contain large variations in geometric scale, especially in open landscapes. This may make global edge stopping functions difficult to control. A local linear model may be assumed for the surface depths and deviation from its clip space plane may be measured. The local depth model may be estimated using screen-space partial derivatives of clip-space depth. This may give a weight function defined as:

$$w_z = \exp\left(-\frac{|z(p) - z(q)|}{\sigma_z |\nabla z(p) \cdot (p - q)| + \varepsilon}\right), \quad (3)$$

where $\nabla z$ is the gradient of clip-space depth with respect to screen space coordinates, and $\varepsilon$ is a small value to avoid division by zero.

Normal

A cosine term may be used for the edge-stopping function on world-space normals:

$$w_n = \max(0, n(p) \cdot n(q))^{\sigma_n}, \quad (4)$$

for an input normal n(p) at point p on the image plane. Mesh simplification and anti-aliasing algorithms may use similar terms to control whether to merge two surfaces together.

Luminance

One aspect of the luminance edge-stopping function may include its ability to automatically adapt to all scales by re-normalizing luminance based on its local standard deviation. But operating at low sample counts may introduce instabilities in estimates of variance and standard deviation, which may introduce artifacts. To avoid these, the variance image may be pre-filtered using a 3×3 Gaussian kernel, which may improve reconstruction quality. The luminance edge-stopping function may then become:

$$w_l = \exp\left(-\frac{|l_i(p) - l_i(q)|}{\sigma_l \sqrt{g_{3 \times 3}(\text{Var}(l_i(p)))} + \varepsilon}\right), \quad (5)$$

for a Gaussian kernel $g_{3 \times 3}$ and luminance $l_i(p)$ at position p. Since the luminance variance may reduce with subsequent filter iterations, the influence of $w_i$ may grow with each iteration, which may prevent overblurring. Note that this Gaussian prefilter may not be applied to the variance image propagated to the next iteration of the wavelet transform; this Gaussian may only be used to drive the luminance edge-stopping function.

In this way, the SVGF filter may rely on the spatiotemporal filtering of both color and variance estimates. These estimates may be used to drive a fast a-trous wavelet-based filter with edge-stopping functions, which may improve resulting image quality.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   applying, utilizing a processor, a temporal filter of a filtering pipeline to a current image frame to obtain a color and auxiliary information for each pixel within the current image frame, including for each pixel within the current image frame:
   performing back-projection of a first sample of the pixel in the current image frame to a screen space location in a prior frame,
   determining a second sample located at the screen space location in the prior frame,
   verifying that the first sample and the second sample are located on a same surface, and
   computing the color and the auxiliary information for the pixel based on the first sample and the second sample, responsive to verifying that the first sample and the second sample are located on a same surface;
   providing the auxiliary information for each pixel within the current image frame to one or more subsequent filters of the filtering pipeline; and
   creating a reconstructed image for the current image frame, utilizing the one or more subsequent filters of the filtering pipeline.

2. The method of claim 1, wherein the current image frame includes a number of samples per pixel (spp) below a predetermined threshold.

3. The method of claim 1, wherein the current image frame results from a Monte Carlo sampling method.

4. The method of claim 1, wherein the prior frame is a previously filtered image frame.

5. The method of claim 1, wherein the auxiliary information computed for the pixel based on the first sample and the second sample includes a color variance for the pixel.

6. The method of claim 1, wherein the auxiliary information computed for the pixel based on the first sample and the second sample includes a luminance variance for the pixel.

7. The method of claim 1, wherein the auxiliary information computed for the pixel based on the first sample and the second sample includes frequency analysis information associated with nearby geometry.

8. The method of claim 1, wherein the auxiliary information computed for the pixel based on the first sample and the second sample includes a confidence metric of the color for the pixel.

9. The method of claim 1, wherein the one or more subsequent filters include one or more additional temporal filters.

10. The method of claim 1, wherein the one or more subsequent filters include one or more spatial filters.

11. The method of claim 1, wherein the auxiliary information is used as input for parameters of the one or more subsequent filters to adjust the one or more subsequent filters based on the auxiliary information.

12. The method of claim 1, wherein information output from one subsequent filter is used as input to another subsequent filter within the current image frame.

13. The method of claim 1, wherein information output from one subsequent filter is used as input to another subsequent filter within a subsequent image frame.

14. The method of claim 1, wherein the creating includes storing pixel information in a history buffer for future image frames.

15. A system comprising:
   a processor that is configured to:
   apply a temporal filter of a filtering pipeline to a current image frame to obtain a color and auxiliary information for each pixel within the current image frame, including for each pixel within the current image frame:
   performing back-projection of a first sample of the pixel in the current image frame to a screen space location in a prior frame,
   determining a second sample located at the screen space location in the prior frame,
   verifying that the first sample and the second sample are located on a same surface, and
   computing the color and the auxiliary information for the pixel based on the first sample and the second sample, responsive to verifying that the first sample and the second sample are located on a same surface;
   provide the auxiliary information for each pixel within the current image frame to one or more subsequent filters of the filtering pipeline; and
   create a reconstructed image for the current image frame, utilizing the one or more subsequent filters of the filtering pipeline.

16. The system of claim 15, wherein the prior frame is a previously filtered image frame.

17. The system of claim 15, wherein the auxiliary information is used as input for parameters of the one or more subsequent filters.

18. A non-transitory computer-readable storage medium storing instructions that, when executed by a processor, causes the processor to perform steps comprising:
   applying a temporal filter of a filtering pipeline to a current image frame to obtain a color and auxiliary information for each pixel within the current image frame, including for each pixel within the current image frame:
   performing back-projection of a first sample of the pixel in the current image frame to a screen space location in a prior frame,
   determining a second sample located at the screen space location in the prior frame,
   verifying that the first sample and the second sample are located on a same surface, and
   computing the color and the auxiliary information for the pixel based on the first sample and the second sample, responsive to verifying that the first sample and the second sample are located on a same surface;
   providing the auxiliary information for each pixel within the current image frame to one or more subsequent filters of the filtering pipeline; and
   creating a reconstructed image for the current image frame, utilizing the one or more subsequent filters of the filtering pipeline.

19. The method of claim 1, wherein the temporal filter is applied to the current image frame with respect to a plurality of prior frames, and wherein the temporal filter performs temporal anti-aliasing.

20. The method of claim 1, wherein verifying that the first sample and the second sample are located on a same surface includes verifying consistency between the first sample and the second sample with respect to depth, object-space normal, and mesh ID.

* * * * *